United States Patent [19]

McCoy

[11] 4,014,780
[45] Mar. 29, 1977

[54] RECOVERY OF OIL FROM REFINERY SLUDGES BY STEAM DISTILLATION

[75] Inventor: Drew E. McCoy, Nederland, Tex.
[73] Assignee: Texaco Inc., New York, N.Y.
[22] Filed: Apr. 14, 1975
[21] Appl. No.: 567,585
[52] U.S. Cl. .................................. 208/13; 208/188
[51] Int. Cl.$^2$ ........................................ C10G 31/08
[58] Field of Search ...................... 208/13, 185, 188

[56] References Cited
UNITED STATES PATENTS

| | | | |
|---|---|---|---|
| 1,709,230 | 4/1929 | Potter et al. | 208/185 |
| 1,878,933 | 9/1932 | Lawton | 208/13 |
| 3,692,668 | 9/1972 | McCoy et al. | 208/13 |
| 3,696,021 | 10/1972 | Cole et al. | 208/13 |
| 3,716,474 | 2/1973 | Hess et al. | 208/13 |

Primary Examiner—Herbert Levine
Attorney, Agent, or Firm—T. H. Whaley; C. G. Ries; Walter D. Hunter

[57] ABSTRACT

A process for deoiling and dewatering refinery sludges in which sludges, optionally mixed with a diluent oil such as recycle oil recovered in the process, are contacted in a heating zone with steam or superheated steam to effect separation of the sludges into dry, oil-free, free-flowing solids and an oil-water vapor phase which on condensation yields a mixture of oil and water. The oil recovered from this mixture is suitable for a variety of purposes such as for cracking stock, etc. and the water recovered exhibits a reduced Chemical Oxygen Demand. The dry, free flowing solids recovered from the heating zone are useful for a wide variety of applications, such as for land fill.

5 Claims, 1 Drawing Figure

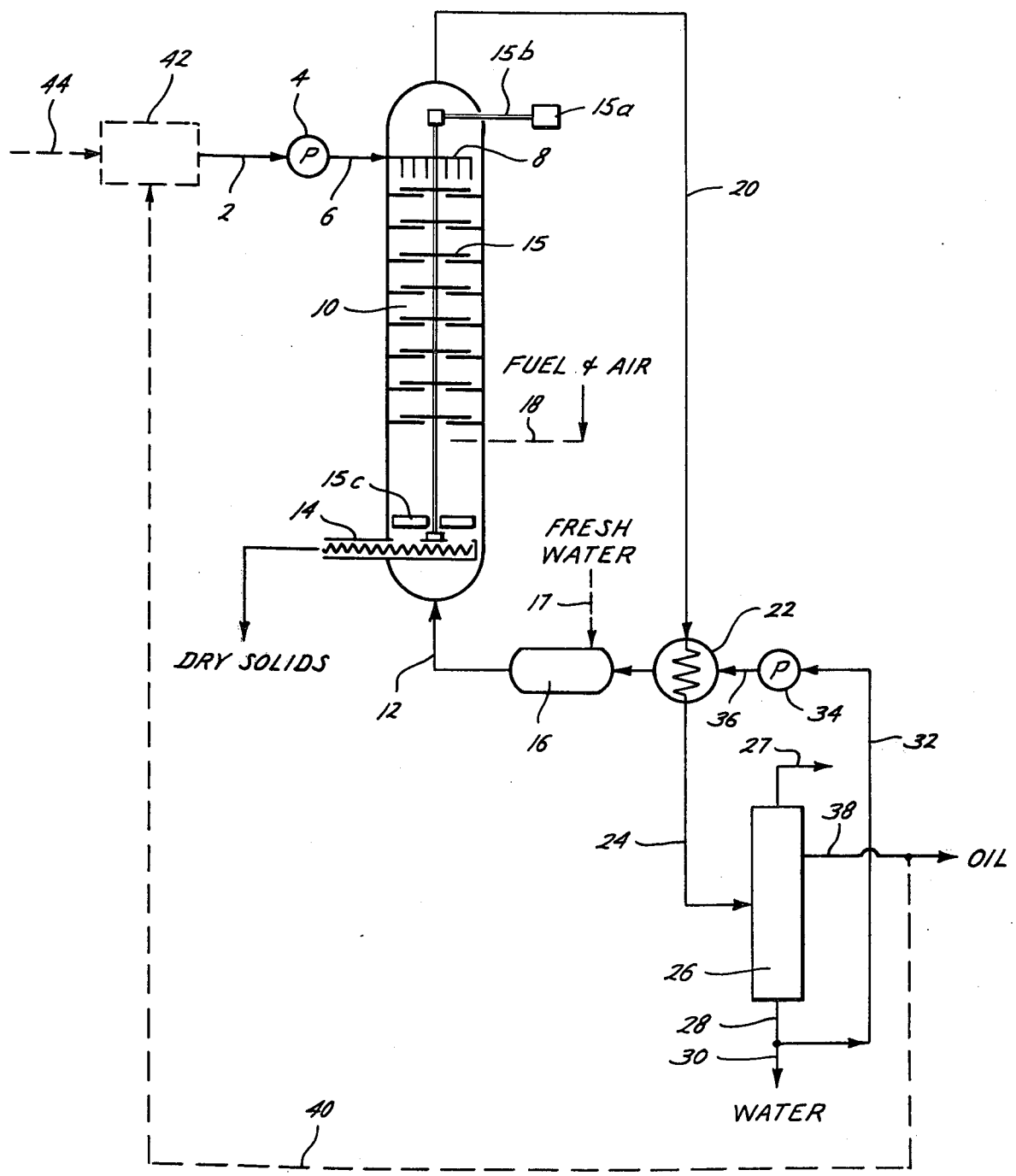

RECOVERY OF OIL FROM REFINERY SLUDGES BY STEAM DISTILLATION

BACKGROUND OF THE INVENTION

1. Field of the Invention

This invention relates to a process for deoiling and dewatering refinery sludges in which sludges optionally mixed with a diluent oil, such as recycle oil recovered in the process, are contacted with steam or superheated steam in a heating zone to effect separation of the sludges into dry, free-flowing solids having a substantially reduced oil content, and an oil-water vapor phase. Condensation of the oil-water vapor phase withdrawn from the heating zone yields an oil phase and a water phase which can be conveniently separated to yield oil suitable, for example, as a cracking feedstock and water with a reduced Chemical Oxygen Demand.

2. Description of the Prior Art

Petroleum based refinery sludges are widely encountered waste by-products of the petroleum refining industry. Such sludges are typically stable emulsions of oil, water and solid particulates. The solids originate as sands and clays contained in crude oil, stray catalyst particles, coke fines and as precipitates, scale and rust derived from various refinery processes, etc.

Since petroleum sludges are produced continuously in refineries, they pose a constant disposal problem. For example, large amounts of sludges accumulate on the bottoms of settling ponds used to remove suspended matter from refinery water effluent streams. Eventually, the pond bottoms must be dredged in order to maintain effluent quality and large volumes of sludges are generated for disposal. API separator bottoms and oilsoaked sand and soil resulting from oil spills also contribute to the sludge disposal problems of refineries. The nature of the sludge compositions has made it difficult over the years to economically deoil and dewater the sludges for pollution-free disposal.

Incineration offers one means of disposing of these sludges. However, the complex nature of such materials make it necessary to provide substantial air pollution control facilities to prevent atmospheric pollution during burning operations. Also, only a fraction of the value of the oil content in the sludges can be recovered in the form of heat and some method of disposal is still required for the non-combustible solids which form an appreciable part of the sludges.

Various processes have been advanced for deoiling refinery sludges to recover the oil contained therein for re-use. However, such processes have not been adopted to any great extent by the industry. For example, the use of both benzene and naphtha with added water in attempts to deoil sludges have been found economically unattractive because the pond settling characteristics of the resulting mass is generally unsatisfactory. Likewise, attempts to deoil and break sludges with iso-octane and gas oil have not been generally successful because the oil phase and the water-solids phase do not separate.

A typical petroleum sludge contains about 35% solids, about 38% water, with the balance being oil. The high content of the oil and its value as a cracking stock make it desirable to recover as much of the oil present in the sludges as possible for removal and recycling to the refinery cracking unit. There is a need in the art, therefore, for the economic process to recover this oil while at the same time producing a readily disposable solid and desirably one in which the water content of the sludges issuing from the process has a reduced Chemical Oxygen Demand.

One of the principal objects of this invention is to provide a process for recovering dry, free-flowing solids having a substantially reduced oil content from refinery sludges.

Another object of this invention is to provide a continuous process by which refinery sludges can be de-oiled and dewatered under substantially atmospheric pressure conditions.

SUMMARY OF THE INVENTION

In the process of this invention the refinery sludges which are highly viscous and abrasive due to heavy oils and solid particles present and although not readily pumped through restricted areas such as heat exchanger tubes generally can be successfully handled by slurry pumps. If desired, the extremely viscous sludges can be mixed and diluted with oil such as recycle oil derived from the process or any hydrocarbon oil fraction derived, for example, from refinery operations and preferably having a boiling point of not less than about 300° F to provide a sludge mixture of improved pumpability and heat transfer. Generally, if it is found desirable to dilute the sludge, from about 0.25 to about 5.0 volumes or more and, preferably, about 0.5 to about 2.0 volumes of the hydrocarbon oil are mixed with each volume of the sludge.

In the process of this invention the sludge as received or in diluted form is pumped by means of a sludge feed pump (i.e., a slurry pump) into the central or upper part of a heating zone, i.e., a steam distillation tower. The tower is provided with a series of revolving or stationary grates, vibrating screens, etc. which discharge into the inlet section of a mechanical device, such as a screw conveyor.

In this process in which the oil from the sludge is recovered while at the same time the solids are converted into a more readily disposable form, steam distillation is employed in treating the sludge. The use of steam distillation is extremely advantageous in a process of this type in which a high boiling hydrocarbon must be separated from a solid. In the sludge the oil adsorbed by the solids has a very wide boiling range. Some fractions may be vaporized at relatively low temperatures, whereas the heavy oil fractions require very high temperatures before vaporization occurs. These high temperatures under other heating conditions could result in coking or destructive distillation of the hydrocarbons.

The temperature required for vaporization of the hydrocarbons in the sludge can be substantially reduced by vaporizing the hydrocarbon into a stream of carrier vapor in the manner of this invention. The carrier vapor may be any inert gas, such as nitrogen, or carbon dioxide but steam is the most economical of the available gases. If desired, this process can be operated under a vacuum and further temperature reductions and a reduction in stripping steam requirement can be realized.

Two methods may be employed to bring the sludge up to the desired distillation temperature. The stripping steam may be superheated to where the superheat is sufficient to heat the vessel and contents to the operating temperature and vaporize the water and hydrocarbons in the sludge without steam condensation occurring. As an alternative, a suitable fuel injected and burned directly in the bottom of the tower with the hot combustion gases passing up through the tower may be used to supply most of the process heat requirements or the sludge feed may be preheated under pressure to a temperature of from about 200° to about 450° F in any suitable preheater such as gas or oil fired heat prior to entering the heating zone.

The sludges, which are oily and cohesive, are introduced to the steam distillation tower by a slurry pump. As the hydrocarbons and water are removed from the sludge, the solids become dry, granular, and non-cohesive and fall to the bottom of the tower through a series of grates. A mechanical device, such as a screw conveyor, then is utilized to remove the solids from the bottom of the tower.

The steam and hydrocarbon vapors are withdrawn from the top of the tower to a condenser/heat exchanger in which the vapors are condensed to yield a mixture of oil and water. These are separated gravimetrically in an oil water separator, by centrifugation or any other suitable means. Product oil is drawn off at this point and is suitable for use as a cracking feedstock. In some instances a portion of the oil may be used as a fuel for the stripping steam boiler.

A portion of the water from the oil water separator can be pumped back through the heat exchanger to the stripping steam boiler or fresh water may also be used as make-up for the boiler.

The temperature of the steam employed in this process generally will vary from about 250° to 700° F and, preferable, will be from about 300° to 600° F. As previously mentioned superheated steam can be advantageously employed.

In the following examples, and through the specification, the term "Chemical Oxygen Demand", abbreviated "COD", is used in the usual sense. Thus COD denotes the total oxidizable material present in the liquid under consideration regardless of whether or not it is biodegradable. BOD tests, on the other hand, denote the amount of oxygen consumed during a five-day period of bacterial activity at 20° C. on a chemically standardized and stabilized sample. Although COD is not strictly comparable to the biological oxygen demand (BOD), it is believed sufficiently useful as an indication of reduction of BOD to provide a basis for comparison of the effectiveness of alternate methods of treatment, particularly when applied to comparable waste samples.

EXAMPLE I

Typical sludges which can be successfully treated by the process of this invention include the following:

A. Bottom Sludge — a sludge obtained from a refinery reservoir which contained 5–10% of free-floating oil-water emulsions while the remainder was a gritty, oily, very viscous liquid and having the following analysis:

| | |
|---|---|
| Water, Wt.% | 25 |
| Oil, Wt.% | 33 |
| Residue, Wt.% | 34 |
| Loss during analysis, Wt.% | 8 |
| Wt.% organic and volatile of residue | 27 |
| Wt.% inorganic of residue | 73. |

EXAMPLE II

B. Refinery Pit Disposal Sludge: a black, oily, and gritty material having the following analysis:

| | |
|---|---|
| Water, Wt.% | 48 |
| Oil, Wt.% | 24 |
| Residue, Wt.% | 22 |
| Loss during analysis Wt.% | 6 |
| Wt.% organic and volatile of residue | 24 |
| Wt.% inorganic of residue | 76, and |

C. BS and W Sludge: (Bottom Sediment and Water): a sludge obtained from tank bottoms, etc. which was black, oily and gritty and had the following analysis:

| | |
|---|---|
| Water, Wt.% | 43 |
| Oil, Wt.% | 17 |
| Residue, Wt.% | 27 |
| Loss during analysis Wt.% | 13 |
| Wt.% organic and volatile of residue | 27 |
| Wt.% inorganic of residue | 73. |

The present invention can be more readily understood by referring to the accompanying flow diagram in which for purposes of illustration a preferred embodiment is set forth. Sludge feed is fed through line 2 to the inlet side of pump 4 from which it is passed by means of line 6 into distributor manifold 8 located in the upper part of steam distillation tower 10 which is equipped with a series of rotating grates 15 rotated by shaft 15b connected to motor 15a. The bottom part of this tower is equipped with steam inlet line 12, screw conveyor 14 and optional fuel injection line and combustion nozzles 18. Steam from steam boiler 16 is conveyed to the bottom of steam distillation tower 10 by means of line 12. A suitable fuel and air mixture is introduced into tower 10 by means of optional fuel injection line and combustion nozzles 18 and burned inside the tower to provide additional heat if needed. During the heating or steam distillation process the sludge is separated into a water-oil vapor which is withdrawn overhead from tower 10 by means of line 20 and routed to the tube side of condenser-heat exchanger 22. As the hydrocarbons and water are removed from the sludge the solids become dry, granular and noncohesive and fall to the bottom of tower 10 and pass through stationary grates 15c which can be a vibrating screen, for example, or simply a series of grates which discharge into screw conveyor 14 by which the dry free-flowing solids are removed from the bottom of the tower. These dry solids are useful for a variety of purposes and, for example, are readily disposable as land fill. From condenser-heat exchanger 22 there is discharged an oil and water mixture which is conveyed via line 24 to gravity separator 26. Water having a reduced Chemical Oxygen Demand is discharged from the bottom of separator 26 via line 30. A part of this water may be utilized as boiler feed water in this process and is passed by means of line 32, boiler feed pump 34 and line 36 to the shell side of condenser-heat exchanger 22, and then via line 38 to steam boiler 16. The remainder of the water may be employed as process water in other parts of the refinery or it may be sent for further reduction of COD to a suitable biological treating operation such as an activated sludge tank. Optionally, fresh water may be introduced into the boiler via line 17. Oil is withdrawn from separator 26 by means of line 38 and it is then pumped to an appropriate storage area. Optionally, a part of the oil product may be conveyed via line 40 to mixing zone 42 where it is mixed with sludge introduced via line 44. In this case, the sludge diluted with oil is then routed from mixing zone 42 via line 2 to pump 4. Vent gases from the separator 26 are withdrawn overhead and conveyed via line 27 to an appropriate vent gas disposal system.

What is claimed is:

1. A continuous process for deoiling and dewatering refinery sludges which comprises:
   a. introducing the sludge into a heating zone,
   b. contacting the sludge in the said heating zone with steam thereby effecting separation of the sludge into an oil-water vapor phase and a dry, free-flowing solids phase,
   c. withdrawing from the upper part of the said heating zone the oil-water vapor phase and from the lower part the dry, free flowing solids phase,
   d. condensing the said oil-water vapor phase thereby forming a mixture of oil and water,
   e. separating and recovering water and oil from the said mixture, and wherein prior to introducing the sludge into the heating zone in step (a) about 0.5 to about 2.0 volumes of hydrocarbon oil are mixed with each volume of the sludge.

2. The process of claim 1 wherein step (b) the sludge is contacted with superheated steam.

3. The process of claim 1 wherein in step (b) the temperature of the steam is from about 250° to about 700° F.

4. The process of claim 1 wherein the said sludge is preheated prior to step (a).

5. The process of claim 1 wherein in step (e) the oil and the water are separated gravimetrically.

* * * * *